US008970674B2

(12) United States Patent
Ota

(10) Patent No.: US 8,970,674 B2
(45) Date of Patent: Mar. 3, 2015

(54) THREE-DIMENSIONAL MEASUREMENT APPARATUS, THREE-DIMENSIONAL MEASUREMENT METHOD AND STORAGE MEDIUM

(75) Inventor: Kazuyuki Ota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 13/325,463

(22) Filed: Dec. 14, 2011

(65) Prior Publication Data

US 2012/0162371 A1 Jun. 28, 2012

(30) Foreign Application Priority Data

Dec. 28, 2010 (JP) .................................. 2010-293804

(51) Int. Cl.
*H04N 13/02* (2006.01)
*G01B 11/16* (2006.01)
*G01B 11/25* (2006.01)

(52) U.S. Cl.
CPC ............ *H04N 13/0253* (2013.01); *G01B 11/16* (2013.01); *G01B 11/25* (2013.01)
USPC ......................................................... 348/46

(58) Field of Classification Search
CPC .... H04N 13/0253; G01B 11/25; G01B 11/24; G06T 7/0057
USPC .......................................................... 348/46
See application file for complete search history.

(56) References Cited

U.S. PATENT DOCUMENTS

| 7,502,504 | B2 | 3/2009 | Ban et al. | |
| 8,090,194 | B2 * | 1/2012 | Golrdon et al. | 382/154 |
| 8,436,890 | B2 | 5/2013 | Mamiya | |
| 2004/0081352 | A1 | 4/2004 | Ban et al. | |
| 2007/0177160 | A1 * | 8/2007 | Sasaki | 356/603 |
| 2012/0133741 | A1 * | 5/2012 | Wagner | 348/46 |

FOREIGN PATENT DOCUMENTS

| JP | 2006-226815 A | 8/2006 |
| JP | 2006-292385 A | 10/2006 |
| JP | 3859571 B | 12/2006 |
| JP | 2009-042015 A | 2/2009 |

* cited by examiner

*Primary Examiner* — Thai Tran
*Assistant Examiner* — Jose Mesa
(74) *Attorney, Agent, or Firm* — Fitzpatrick, Cella, Harper & Scinto

(57) ABSTRACT

A three-dimensional measurement apparatus comprises a light irradiation unit adapted to irradiate a measurement target with pattern light, an image capturing unit adapted to capture an image of the measurement target, and a measurement unit adapted to measure a three-dimensional shape of the measurement target from the captured image, the three-dimensional measurement apparatus further comprising: a change region extraction unit adapted to extract a change region where a change has occurred when comparing an image of the measurement target captured in advance with the captured image of the measurement target; and a light characteristic setting unit adapted to set characteristics of the pattern light from the change region, wherein the measurement unit measures the three-dimensional shape of the measurement target at the change region in a captured image after irradiation of the change region with the pattern light with the characteristics set by the light characteristic setting unit.

10 Claims, 12 Drawing Sheets

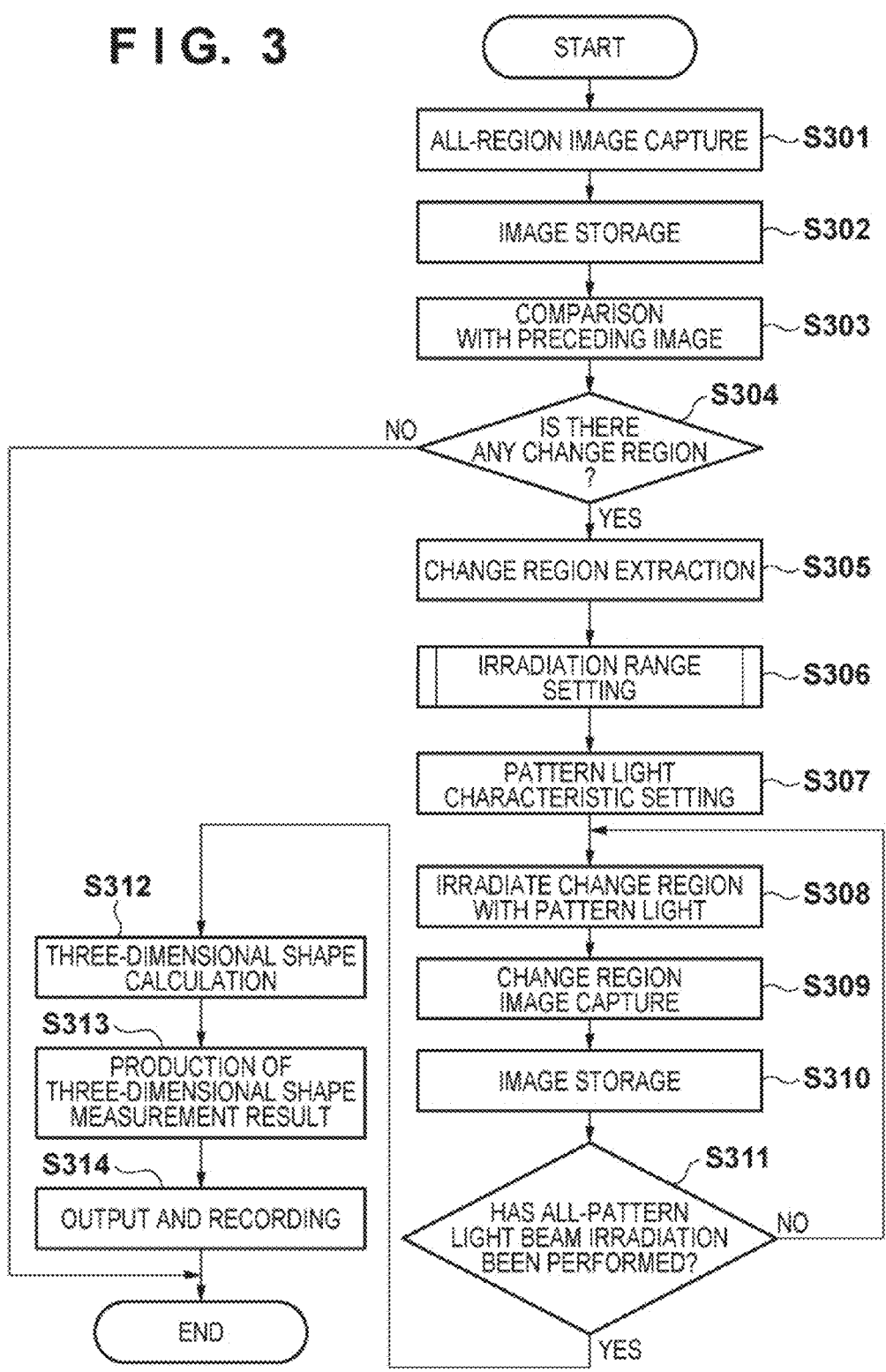

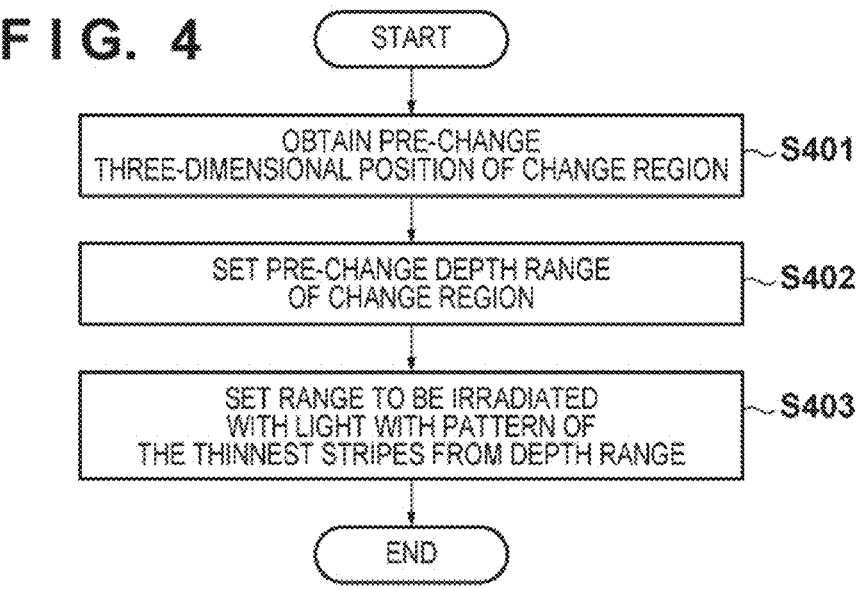
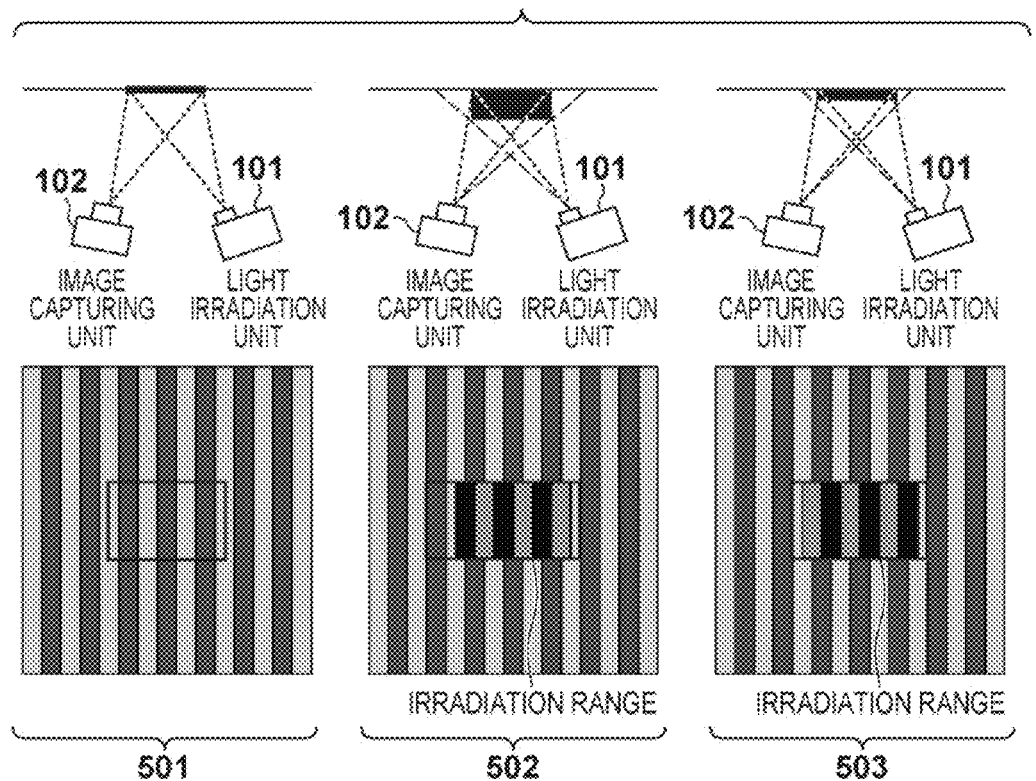

THREE-DIMENSIONAL MEASUREMENT APPARATUS, THREE-DIMENSIONAL MEASUREMENT METHOD AND STORAGE MEDIUM

BACKGROUND OF THE INVENTION

1. Field of the Invention

The present invention relates to a three-dimensional measurement apparatus, a three-dimensional measurement method, and a storage medium.

2. Description of the Related Art

As a method for measuring the three-dimensional shape of an object to be measured from the principles of a triangulation method after the capture of an image of the object to be measured on which pattern light has been projected subsequent to the projection of the pattern light onto the object to be measured, there is a pattern projection method. Typical examples of a high-accuracy three-dimensional shape measurement technique using such a pattern projection method include a spatial encoding method, a phase-shift method, and an optical cutting method. However, with a spatial encoding method, for example, since plural stripe pattern light beams are projected onto an object to be measured in time series to capture its images, it takes time to three-dimensionally measure the object to be measured by the number of the captured images. With a phase-shift method as well, time is taken because plural images are captured in accordance with measurement regions. In an optical cutting method, the capture of many images is required because the capture is performed while scanning a region using line projection. To reduce measurement time even slightly, it has been considered that a technique of limiting a region(s) to be three-dimensionally measured is used.

As an example of such a conventional technique, there is a technique in which a relationship is stored that has been established between a region from which characteristics of an object to be measured that could be obtained from a two-dimensional image of the object to be measured to be extracted and a region to be three-dimensionally measured of the object to be measured, the characteristics of the component are extracted from the two-dimensional image at the time of its three-dimensional measurement, and the above three-dimensional measurement region is irradiated with light to obtain data on its three-dimensional shape (see Japanese Patent No. 3859571).

As an example of a conventional technique for effectively controlling pattern projection, there is a technique in which a pattern is projected onto an object to be measured first to capture an image of the object to be measured, and then the type and the number of patterns to be projected the second and subsequent times are determined by an optical spatial modulation element based on the amount of characteristics and the amount of a change(s) of the object to be measured in the captured image (see Japanese Patent Laid-Open No. 2006-292385).

In conventional pattern projection methods including the foregoing method, the effective use of three-dimensional shape data obtained in advance for the three-dimensional measurement of only a region(s) where such measurement is required is not made; therefore it is required that three-dimensional measurement be made of the whole object, and thus there is a need to make three-dimensional measurement at a region(s) where no change has occurred. Because of this, in cases where many images are captured and/or many pixels are used, it takes time to make three-dimensional measurement. In methods of limiting a measurement region from a two-dimensional image, it is required that a measurement system other than a three-dimensional measurement system be provided, and therefore a problem has arisen of a measuring system and a processing system becoming complicated.

In view of the above problem, the present invention provides a technique of making three-dimensional measurement at high speed through the effective use of three-dimensional shape data obtained in advance.

SUMMARY OF THE INVENTION

According to one aspect of the present invention, there is provided a three-dimensional measurement apparatus comprising a light irradiation unit adapted to irradiate a measurement target with pattern light, an image capturing unit adapted to capture an image of the measurement target irradiated with the pattern light by the light irradiation unit, and a measurement unit adapted to measure a three-dimensional shape of the measurement target from the image captured by the image capturing unit, the three-dimensional measurement apparatus further comprising: a change region extraction unit adapted to extract a change region where a change has occurred when comparing an image of the measurement target captured in advance by the image capturing unit with the image of the measurement target captured by the image capturing unit; and a light characteristic setting unit adapted to set characteristics of the pattern light to be emitted by the light irradiation unit from the change region extracted by the change region extraction unit, wherein the measurement unit measures the three-dimensional shape of the measurement target at the change region in an image captured by the image capturing unit after irradiation of the change region with the pattern light with the characteristics set by the light characteristic setting unit.

According to one aspect of the present invention, there is provided a three-dimensional measurement apparatus comprising a light irradiation unit adapted to irradiate a measurement target with pattern light, an image capturing unit adapted to capture an image of the measurement target irradiated with the pattern light by the light irradiation unit, and a measurement unit adapted to measure a three-dimensional shape of the measurement target from the image captured by the image capturing unit, the apparatus further comprising a setting unit adapted to set characteristics of pattern light to be emitted by the light irradiation unit and be used at a time of a subsequent three-dimensional measurement of the measurement target by the measurement unit based on advance data about a three-dimensional shape of the measurement target and a result of the three-dimensional shape of the measurement target measured by the measurement unit.

Further features of the present invention will be apparent from the following description of exemplary embodiments with reference to the attached drawings.

BRIEF DESCRIPTION OF THE DRAWINGS

FIG. 3 is a flowchart of processing by the three-dimensional measurement apparatus according to the first embodiment;

FIG. 4 is a flowchart of processing by the three-dimensional measurement apparatus according to the first embodiment;

FIG. 5 shows illustrations each showing the relationship between the stripe pattern light used based on a spatial encoding method according to the first embodiment and the depth of an object to be measured;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A first embodiment, in which a three-dimensional image captured in advance is used as advance data relating to three-dimensional shape data, will now be described. As an exemplary three-dimensional measurement technique, a spatial encoding method, which is a typical high-accuracy three-dimensional shape measurement technique, is applied in this embodiment. In the following, the first embodiment of the present invention will be described with reference to the drawings.

To begin with, the principle of spatial encoding will be described below. This is a technique for calculating a three-dimensional shape, and special encoding in which a space is subjected to binary encoding is performed by irradiating with stripe pattern light forming alternating bright portions and dark portions at a given width, and a three-dimensional shape is then determined based on the principles of a triangulation method using the amount of a displacement from a position indicated with a corresponding code.

Figure 12:
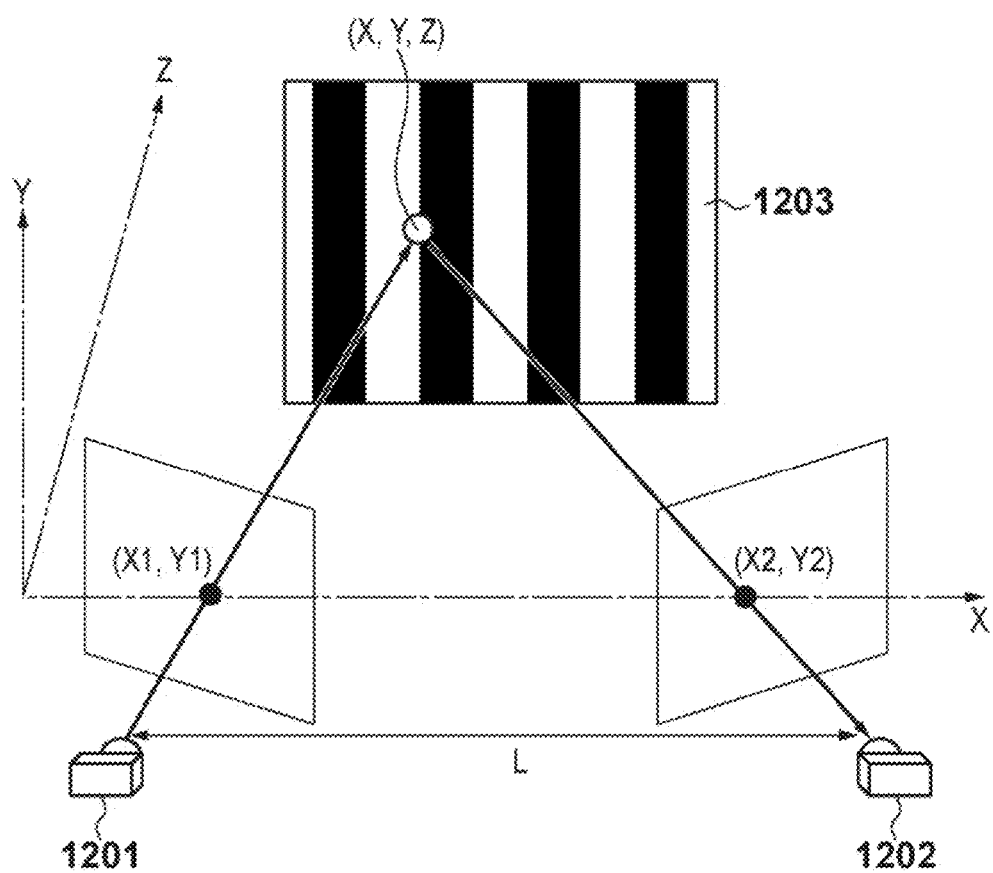
FIG. 12 is a conceptual illustration of the configuration of the three-dimensional measurement apparatus and a three-dimensional measurement method.

FIG. 12 shows a concept regarding the configuration of a three-dimensional measurement apparatus and a three-dimensional measurement method. In general, the three-dimensional measurement apparatus is constituted by a projector 1201 that irradiates an object to be measured with pattern light and a camera 1202 that captures reflected patterns. The projector 1201 irradiates an object to be measured 1203 with stripe pattern light forming alternating bright portions and dark portions at a given width. The stripe pattern light has a plurality of predetermined pattern shapes, each of which is irradiated, and images are captured each time to obtain image data. It is assumed that the position of the boundary of a bright portion and a dark portion of the object to be measured 1203 has coordinates (X,Y,Z), and it is assumed that the principal position of the projector 1201 and the principal position of the camera 1202 given by linking the boundary position (X,Y,Z), the projector 1201, and the camera 1202 together have coordinates (X1, Y1) and (X2, Y2) respectively. The principal position (X2, Y2) of the camera 1202 is determined by the horizontal coordinates of the image capture sensor (such as CCDs or CMOS devices) of the camera 1202. The horizontal coordinates are determined by the horizontal width and the vertical width of the image capture sensor; in an 640×480 image capture sensor, for example, x-coordinates in its horizontal direction are from 0 to 640, and y-coordinates in its vertical direction are from 0 to 480. Likewise, the principal position (X1, Y1) of the projector 1201 is determined by the horizontal coordinates of a light irradiation sensor. Reference letter L put between the projector 1201 and the camera 1202 denotes a base-line length; the length is determined from the configuration of the apparatus. By using these parameters, i.e., by using the principles of a triangulation method, a boundary position (X, Y, Z) on the object to be measured 1203 can be determined. By determining all boundary positions (X, Y, Z) on the entire surface of the object to be measured 1203, the three-dimensional shape of the object to be measured 1203 can be measured.

Figure 13:
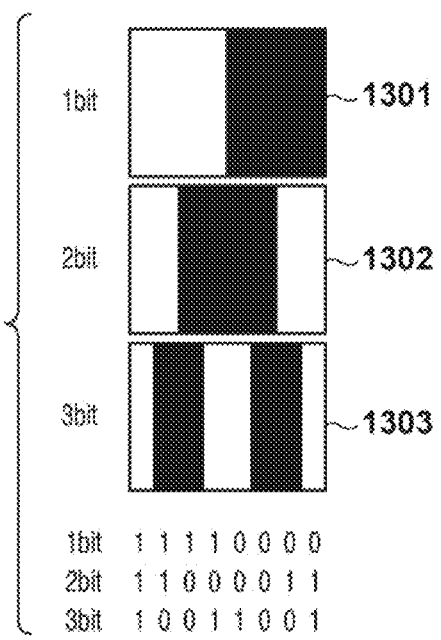
FIG. 13 shows illustrations each showing stripe pattern light projected based on the spatial encoding method using a gray code.

Next, the shape of the stripe pattern light will be described below. FIG. 13 shows each binary-coded stripe pattern light called a gray code with an encoding error resistance. With each reflected pattern captured, a portion observed to be black corresponds to 0, and a portion observed to be white corresponds to 1. In the pattern light 1301, an entire region is divided into two regions, i.e., two regions are encoded into 1 and 0. In the pattern light 1302, four regions as bright and dark portions are encoded into 1, 0, 0, and 1, following which corresponding stripe pattern light irradiation is performed and an image of the light is captured. And further, in the pattern light 1303, eight regions are encoded into 1, 0, 0, 1, 1, 0, 0, and 1, following which the corresponding stripe pattern light irradiation is performed and an image of the light is captured. By assigning the encoded region numbers to the regions in this way, the regions can be determined. In FIG. 13, the regions can be determined to be regions (1, 1, 1), (1, 1, 0), (1, 0, 0), (1, 0, 1), (0, 0, 1), (0, 0, 0), (0, 1, 0), and (0, 1, 1). Since a space can be divided into eight regions by using three stripe pattern light beams like this, such spatial encoding is referred to as 3-bit spatial encoding; the stripe pattern light 1301, the stripe pattern light 1302, and the stripe pattern light 1303 are respectively referred to as 1-bit stripe pattern light, 2-bit stripe pattern light, and 3-bit stripe pattern light.

In a case where the shape is measured in further detail, by performing irradiation with n stripe pattern light beams while consecutively dividing the regions into bright and dark portions, region numbers are assigned to $2^n$ regions provided by dividing the irradiation region covered by the projector 1201, whereby the individual regions can be determined. With three-dimensional measurement in which a region is divided into 1024 regions, for example, 10-bit spatial encoding is performed.

An advantage of using gray codes is that if an encoding error of the stripe pattern light occurs at the boundary of two regions due to displacement, blurring, or the like, both regions will be merely determined to be regions simply adjacent to each other at worst, and any encoding error that determines as a greatly displaced region will not occur. Therefore spatial encoding using gray codes is a generally used method.

Figure 1:
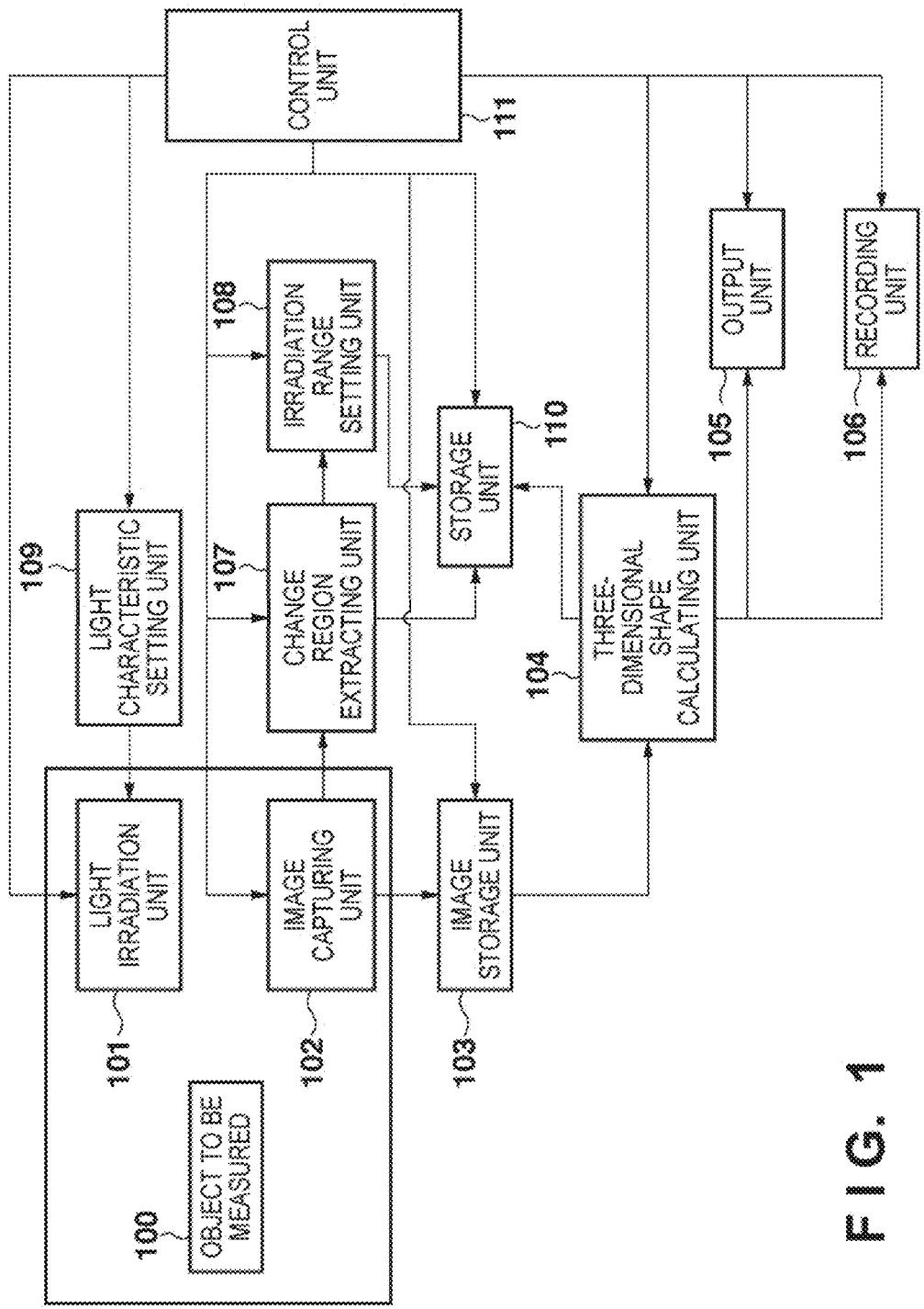
FIG. 1 is a block diagram of a three-dimensional measurement apparatus according to a first embodiment of the present invention.

Then the configuration of a system in which minimum necessary projection and calculation are performed will be described with reference to a spatial encoding method using an image obtained in advance according to the present invention and an image newly captured for three-dimensional measurement. FIG. 1 is a block diagram of a system that measures the three-dimensional shape of an object to be measured by pattern projection.

An object to be measured 100 is a measurement target to be measured by the measurement apparatus according to this embodiment. A light irradiation unit 101 irradiates the object to be measured 100 with pattern light. An image capturing unit 102 captures an image of the object to be measured 100. An image storage unit 103, which has a capacity enough to store a plurality of images, stores the image captured by the image capturing unit 102. A three-dimensional shape calculating unit 104 calculates the three-dimensional shape of the object to be measured 100 after the irradiation of the object to be measured 100 with the pattern light by the light irradiation unit 101 and the subsequent capture of the image of the irradiated object to be measured 100 by the image capturing unit 102. An output unit 105 outputs a result of the calculation by the three-dimensional shape calculating unit 104. The output unit 105 has a monitor, a printer, or the like for showing the calculation result. A recording unit 106 records the result of the calculation by the three-dimensional shape calculating unit 104. The recording unit 106 is provided with a hard disk, a flash memory, or the like for recording data on the calculation result. A change region extraction unit 107 extracts a region where a change in a status of the object to be measured 100 has occurred after the three-dimensional shape calculation by the three-dimensional shape calculating unit 104. Examples of a change of a status of the object to be measured 100 include a case where when the object to be measured 100 is constituted by a plurality of objects, another object is added to the object to be measured 100, or the constituent object(s) is removed from the object to be measured 100. Examples of a method for extracting such a change region include a method of finding the difference between preceding and current images captured at the image capturing unit 102. In addition, there is also a method of storing a position at which another object has been added or the constituent object(s) has been removed by a robot arm or the like (not shown) to use data on the position. The above methods are each a method of automatically extracting such a change region, whereas there is a method of manually designating the change region by a user while looking at the image of the object to be measured 100 output at the output unit 105; and besides any other method may be used as long as it is a method for extracting such a change region. An irradiation range setting unit 108 sets a range of the object to be measured 100 to be irradiated with pattern light by the light irradiation unit 101 in accordance with the change region extracted by the change region extraction unit 107. By doing so, regions other than the change region are not irradiated with the pattern light. A light characteristic setting unit 109 sets the characteristics of the pattern light corresponding to the irradiation range set by the irradiation range setting unit 108. A storage unit 110 stores data on the three-dimensional shape calculated by the three-dimensional shape calculating unit 104, data on the change region extracted by the change region extraction unit 107, data on the irradiation range set by the irradiation range setting unit 108, etc., and moreover, control information sent from the control unit 111 is stored. The control unit 111 controls operation of the light irradiation unit 101, the image capturing unit 102, the light characteristic setting unit 109, the change region extraction unit 107, the irradiation range setting unit 108, the storage unit 110, the three-dimensional shape calculating unit 104, the output unit 105, and the recording unit 106. The control unit 111 is provided with a CPU, a RAM, a ROM in which various control programs are loaded, and so on.

The various programs loaded in the ROM are a control program for controlling the characteristics of pattern light from the light irradiation unit 101, a control program for controlling the image capturing unit 102, a control program for controlling the light characteristic setting unit 109, etc; moreover, a control program for controlling the change region extraction unit 107, a control program for controlling the irradiation range setting unit 108, a control program for controlling the three-dimensional shape calculating unit 104, etc. are loaded. Furthermore, other programs, such as a control program for controlling the output unit 105 and a control program for controlling the recording unit 106, may be further loaded.

Figure 2:
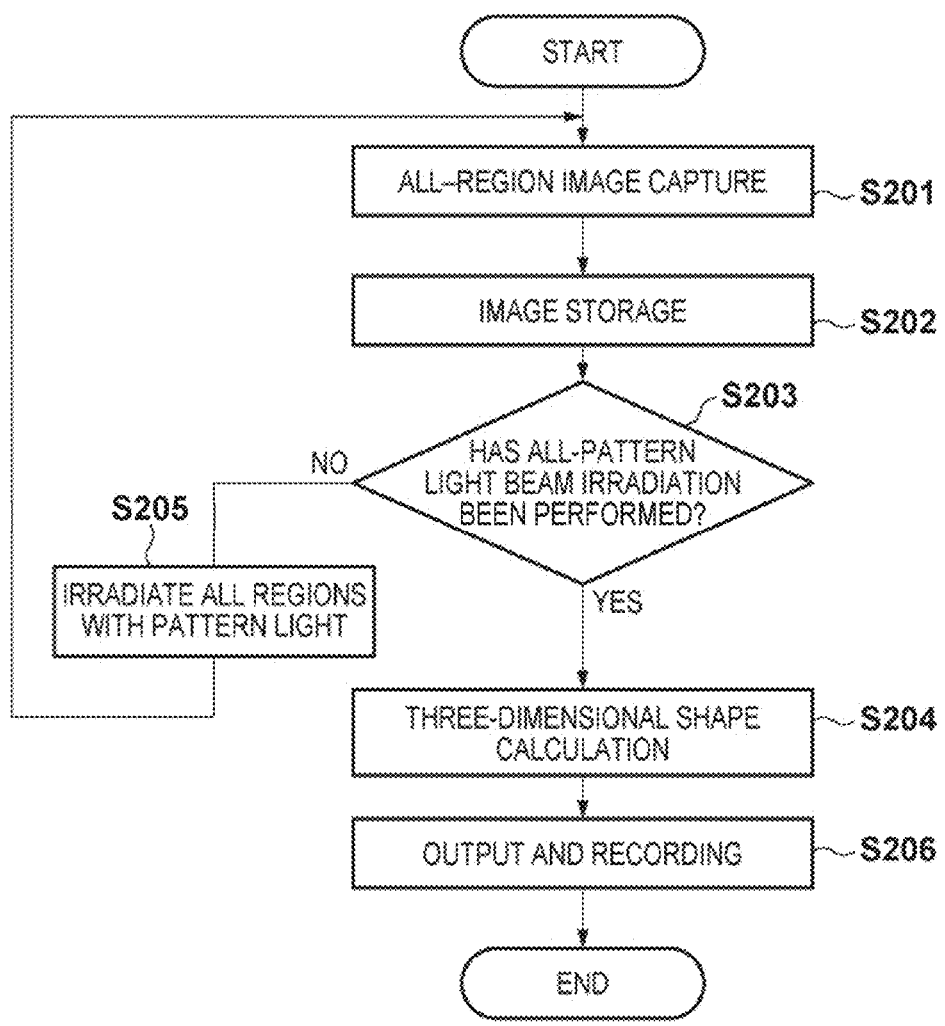
FIG. 2 is a flowchart of processing by the three-dimensional measurement apparatus according to the first embodiment.

FIG. 2 is a flowchart of processing by the measurement apparatus according to this embodiment.

The order of the processing performed in this embodiment will be described below with reference to FIG. 2. FIG. 2 shows the order of the processing performed when three-dimensionally measuring an object to be measured first.

Step 201

In step 201, the control unit 111 sends a all-region image capture signal to the image capturing unit 102 so as to make the image capturing unit 102 capture images of as wide a range as possible, and the image capturing unit 102 captures images of all regions including an object to be measured 100 by irradiation with a plurality of pattern light beams.

Step 202

In step 202, the control unit 111 makes the image storage unit 103 store the captured image.

Step 203

In step 203, the three-dimensional shape calculating unit 104 determines whether the light irradiation unit 101 has performed irradiation with all pattern light beams necessary to calculate its three-dimensional shape. If it is determined that the light irradiation unit 101 has performed irradiation with all pattern light beams necessary to calculate the three-dimensional shape, the processing goes to step 205. If it is determined that the light irradiation unit 101 has not performed irradiation with all pattern light beams necessary to calculate the three-dimensional shape, the processing shifts to step 204.

Step 204

In step 204, the control unit 111 makes the three-dimensional shape calculating unit 104 calculate the three-dimensional shape of the object to be measured 100 from all-pattern irradiation images of the object to be measured 100 captured by the image capturing unit 102.

Step 205

In step 205, the control unit 111 makes the light irradiation unit 101 irradiate the whole region with another pattern light beam.

Step 206

In step 206, by control performed by the control unit 111, the output unit 105 outputs data on the three-dimensional shape of the object to be measured 100, and the recording unit 106 records the shape data. The output unit 105 makes the monitor or the like display the data on the three-dimensional shape of the object to be measured 100. The recording unit 106 stores the data on the three-dimensional shape of the object to be measured 100 in the hard disk, the flash memory, or the like as digital data.

FIG. 3 is a flowchart of processing performed when three-dimensionally measuring an object to be measured again after having made its three-dimensional measurement once.

Step 301

In step 301, the control unit 111 sends a all-region image capture signal to the image capturing unit 102 so as to make the image capturing unit 102 capture images of as wide a range as possible, and the image capturing unit 102 captures images of all regions including the object to be measured 100.

Step 302

In step 302, the control unit 111 makes the image storage unit 103 store the captured images.

Step 303

In step 303, the control unit 111 makes the image storage unit 103 compare the preceding and current images captured and stored in the image storage unit 103.

Step 304

In step 304, the control unit 111 makes the change region extraction unit 107 determine whether there is any change region from the compared images. If the change region extraction unit 107 has made the determination that there is a change region from the images compared through the control by the control unit 111, the processing goes to step 305. If the change region extraction unit 107 has made the determination that there is no change region from the images compared through the control by the control unit 111, the processing ends.

Step 305

In step 305, the control unit 111 makes the change region extraction unit 107 extract the change region from the compared image. A method for extracting a change region will be described later.

Step 306

In step 306, the control unit 111 makes the irradiation range setting unit 108 set a range to be irradiated with pattern light from the extracted change region. A method for setting irradiation range will be described later.

Step 307

In step 307, the control unit 111 makes the light characteristic setting unit 109 set pattern light characteristics corresponding to the set irradiation range to make the light irradiation unit 101 perform pattern light irradiation. A method for setting pattern light characteristics corresponding to irradiation range will be described later.

Step 308

In step 308, the control unit 111 makes the light irradiation unit 101 irradiate the change region with pattern light corresponding to the irradiation range.

Step 309

In step 309, the control unit 111 makes the image capturing unit 102 capture images of the change region irradiated with the pattern light as the irradiation range.

Step 310

In step 310, the control unit 111 makes the image storage unit 103 store the captured image.

Step 311

In step 311, the three-dimensional shape calculating unit 104 determines whether the light irradiation unit 101 has performed irradiation with all pattern light beams necessary to calculate its three-dimensional shape. If it is determined that the light irradiation unit 101 has performed irradiation with all pattern light beams necessary to calculate the three-dimensional shape, the processing goes to step 312. If it is determined that the light irradiation unit 101 has not performed irradiation with all pattern light beams necessary to calculate the three-dimensional shape, the processing goes back to step 308.

Step 312

In step 312, the control unit 111 makes the three-dimensional shape calculating unit 104 calculate the three-dimensional shape of the object to be measured 100 from all-pattern irradiation images of the object to be measured 100 captured by the image capturing unit 102.

Step 313

In step 313, the control unit 111 makes the three-dimensional shape calculating unit 104 combine the whole result of the previous three-dimensional measurement of the object to be measured 100 and a result of the present three-dimensional measurement of the change region and then produce the whole result of the present three-dimensional measurement of the object to be measured 100.

Step 314

In step 314, by control performed by the control unit 111, the output unit 105 outputs data on the three-dimensional shape of the object to be measured 100, and the recording unit 106 records the shape data. The output unit 105 makes the monitor or the like display the data on the three-dimensional shape of the object to be measured 100. The recording unit 106 stores the data on the three-dimensional shape of the object to be measured 100 in the hard disk, the flash memory, or the like as digital data.

Then a method for extracting a change region will be described below. As a method for extracting a change region, there is a method of finding the difference between a preceding and current image captured by the image capturing unit 102, as described earlier. Also, there is method of storing a position at which another object has been added or the constituent object(s) has been removed by a robot arm or the like (not shown) to use the position. In addition, there is also a method of using stripe pattern light based on the spatial encoding method, and this method will be described below.

Figure 14:
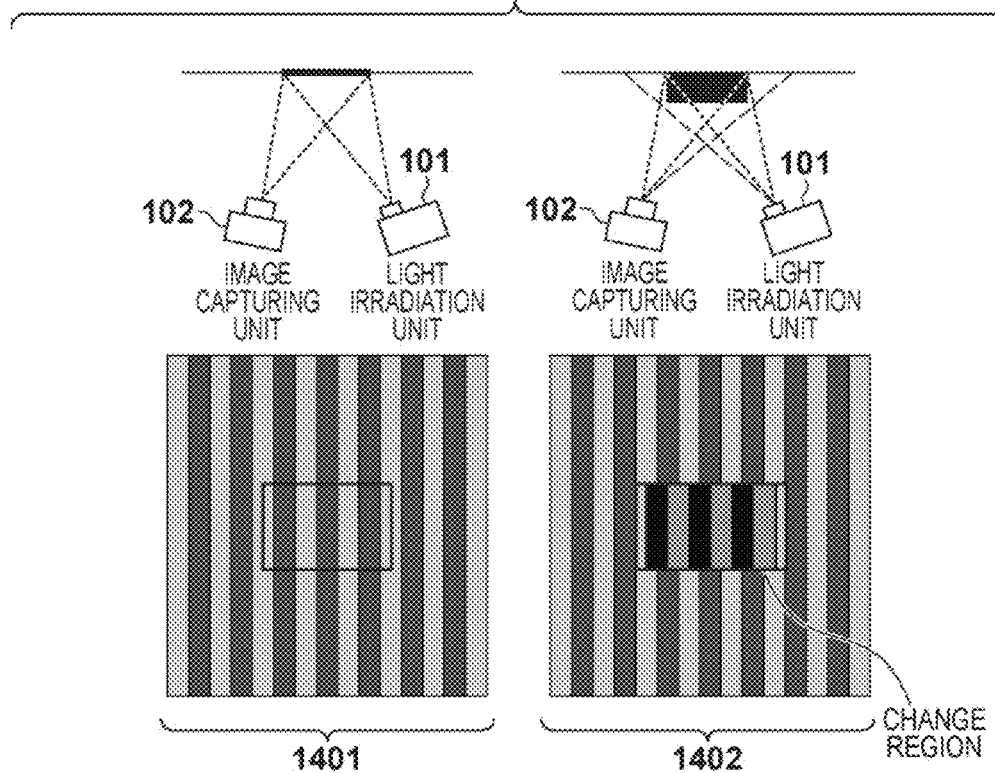
FIG. 14 is an explanatory illustration of a method for extracting a change region of stripe pattern light used based on the spatial encoding method according to the first embodiment.

Reference numeral 1401 in FIG. 14 denotes in the form of an illustration that a plane is irradiated with light with a pattern of the thinnest stripes at the time of the spatial encoding method-based three-dimensional measurement of the plane. This illustration shows the positional relationship between the image capturing unit 102 and the light irradiation unit 101 at the time of the capture of an image of the plane along with the image captured by the image capturing unit 102. The captured image shows a state in which the stripes of the pattern light from the light irradiation unit 101 are evenly arranged.

Reference numeral 1402 in FIG. 14 denotes in the form of an illustration that the object to be measured 100 is irradiated with light with a pattern of the thinnest stripes at the time of the spatial encoding-based three-dimensional measurement of the object to be measured 100 on the plane. This illustration shows the positional relationship between the image capturing unit 102 and the light irradiation unit 101 at the time of the capture of an image of the object to be measured 100 along with the image captured by the image capturing unit 102. The captured image shows a state in which a positional displacement of the stripe pattern light from the light irradiation unit 101 with respect to the stripe pattern light on the plane is caused by the parallax between the image capturing unit 102 and the light irradiation unit 101 resulting from the object to be measured 100 having a height.

As can be seen from the illustrations 1401 and 1402 of FIG. 14, a change region can be extracted by comparing two images captured by the thinnest-stripe pattern light irradiation. And further, the thinnest-stripe pattern light irradiation makes it possible to extract a change region in a greater detail when compared with thick-stripe pattern light irradiation.

This irradiation method has an advantage that since a change region can be extracted using part of the process of performing three-dimensional measurement without undergoing a process tailored for extracting the change region, the application of an extra process load is not required. That is, this method contributes to high-speed three-dimensional measurement.

FIG. 4 is a flowchart of irradiation range setting processing performed when three-dimensionally measuring an object to be measured again after having made its three-dimensional measurement once.

Step 401

In step 401, the control unit 111 makes the irradiation range setting unit 108 obtain the pre-change three-dimensional position of a change region extracted by the change region extraction unit 107.

Step 402

In step 402, the control unit 111 makes the irradiation range setting unit 108 set depth range from the obtained pre-change three-dimensional position of the change region.

Step 403

In step 403, the control unit 111 makes the irradiation range setting unit 108 set a range to be irradiated with the thinnest-stripe pattern light from the set depth range (performs irradiation control processing).

A method for setting irradiation range will be described below in a concrete manner. Reference numeral 501 in FIG. 5 denotes in the form of an illustration that a plane is irradiated with stripe pattern light at the time of the spatial encoding-based three-dimensional measurement of the plane. This illustration shows the positional relationship between the image capturing unit 102 and the light irradiation unit 101 at the time of the capture of an image of the plane along with the image captured by the image capturing unit 102. The captured image shows a state in which the stripes of the pattern light from the light irradiation unit 101 are evenly arranged.

Reference numeral 502 in FIG. 5 denotes in the form of an illustration that the object to be measured 100 is irradiated with stripe pattern light at the time of the spatial encoding-based three-dimensional measurement of the object to be measured 100 on the plane. This illustration shows the positional relationship between the image capturing unit 102 and the light irradiation unit 101 at the time of the capture of an image of the object to be measured 100 along with the image captured by the image capturing unit 102. The captured image shows a state in which a positional displacement of the stripe pattern light from the light irradiation unit 100 with respect to the stripe pattern light on the plane is caused by the parallax between the image capturing unit 102 and the light irradiation unit 101 resulting from the object to be measured 100 having a height. At that time, a range irradiated with the stripe pattern light is set at a region in consideration of the positional displacement.

Reference numeral 503 in FIG. 5 denotes in the form of an illustration that the object to be measured 100 is irradiated with stripe pattern light at the time of its spatial encoding-based three-dimensional measurement after removal of an upper portion of the object to be measured 100 on the plane. This illustration shows the positional relationship between the image capturing unit 102 and the light irradiation unit 101 at the time of the capture of an image of the object to be measured 100 along with the image captured by the image capturing unit 102. The captured image shows a state in which, since the height of the object to be measured 100 has decreased when compared with the height shown in the illustration 502, there is a difference in amount between the positional displacement shown in the illustration 502 and a positional displacement of the stripe pattern light from the light irradiation unit 101 with respect to the stripe pattern light on the plane caused by the parallax between the image capturing unit 102 and the light irradiation unit 101.

From the illustrations 501 to 503 of FIG. 5, it can be seen that even in cases where irradiation with the same stripe pattern light has been performed, stripe patterns differ from one another depending on the depths of objects to be measured. Therefore, in order to set a range to be irradiated with stripe pattern light, an extracted change region and a previously calculated three-dimensional measurement result are used.

Figure 6:
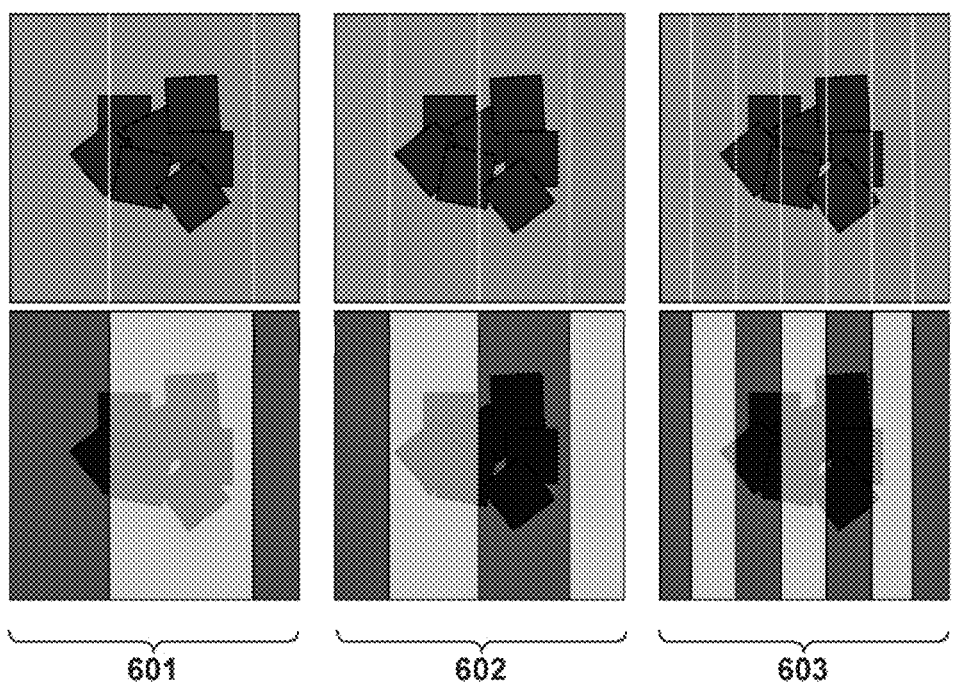
FIG. 6 shows illustrations each showing stripe pattern light used based on the spatial encoding method according to the first embodiment.

A method for setting pattern light characteristics corresponding to irradiation range will be described below. FIG. 6 is an illustration showing images captured by the image capturing unit 102 when irradiating an object to be measured 100 with stripe pattern light beams at the time of the spatial encoding-based three-dimensional measurement of the object to be measured 100. Note that although stripes on an object to be measured in actually captured images are displaced in accordance with its height, the above stripe pattern light beams emitted are depicted as they are for the sake of simplification. The order of the spatial encoding is from 601 to 603, i.e., irradiation with light with a pattern of thick stripes is performed first, and irradiation with light with a pattern of the thinnest stripes is performed last.

Figure 7:
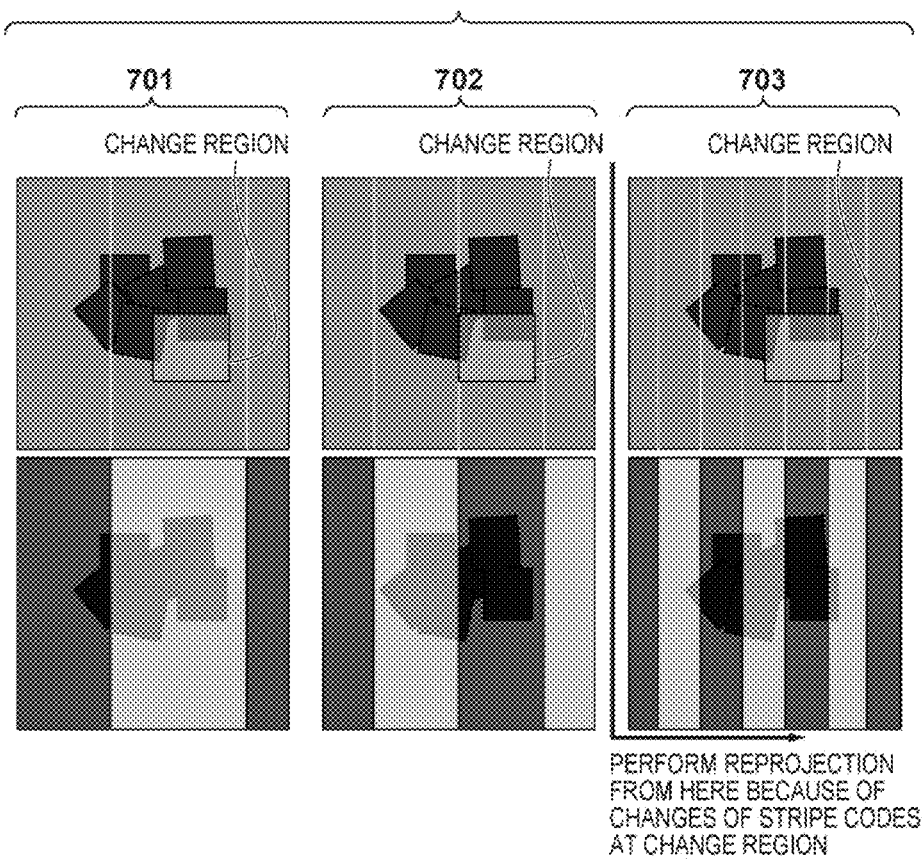
FIG. 7 shows illustrations each showing ranges irradiated with stripe pattern light used based on the spatial encoding method according to the first embodiment.

FIG. 7 is an illustration showing images captured by the image capturing unit 102 when irradiating an object to be measured 100 with stripe pattern light beams at the time of its spatial encoding-based three-dimensional measurement after removal of part of the object to be measured 100. Note that although stripes on an object to be measured in actually captured images are displaced in accordance with its height, the above stripe pattern light beams emitted are depicted as they are for the sake of simplification. The foregoing removed part, i.e., the removed region, is extracted by the change region extraction unit 107 as a change region, following which a range to be irradiated with stripe pattern light is set by the irradiation range setting unit 108. It is unnecessary to three-dimensionally measure regions other than the set irradiation range because their three-dimensional shapes do not change. That is, it is unnecessary to use regions represented as thick stripes other than the set irradiation range for the three-dimensional measurement (see cases denoted by reference numerals 701 and 702). In FIG. 7, at a point in time when the stripe pattern light has become uneven within the irradiation range, three-dimensional measurement using thinner-stripe pattern light can be made (see a case denoted by reference numeral 703). Incidentally, although regions above and below the irradiation range, set in accordance with the extracted change region, are also irradiated with the stripe pattern light in FIG. 7, it is unnecessary to irradiate both regions.

By setting pattern light characteristics corresponding to an irradiation range as a change region as described above, the number of stripe pattern light beams to be emitted can be reduced, and the number of images to be captured can, therefore, be reduced; thus a significantly enhanced three-dimensional measurement speed can be achieved when compared with the three-dimensional measurement of the whole area of a single image.

Second Embodiment

A second embodiment of the present invention will be described below with reference to the drawings. The second embodiment differs from the first embodiment in that irradiation with light with a pattern of the thinnest stripes is performed first, and irradiation with light with a pattern of the thickest stripes is determined in accordance with irradiation range.

The configuration of a three-dimensional measurement apparatus according to the second embodiment is the same as the configuration of the apparatus according to the first embodiment of FIG. 1, and its description will, therefore, be omitted. In this embodiment, the order of the processing shown as FIGS. 2 to 4 is used as in the case of the first embodiment, and its description will also be omitted. In the following, the foregoing difference will be further described.

Figure 8:
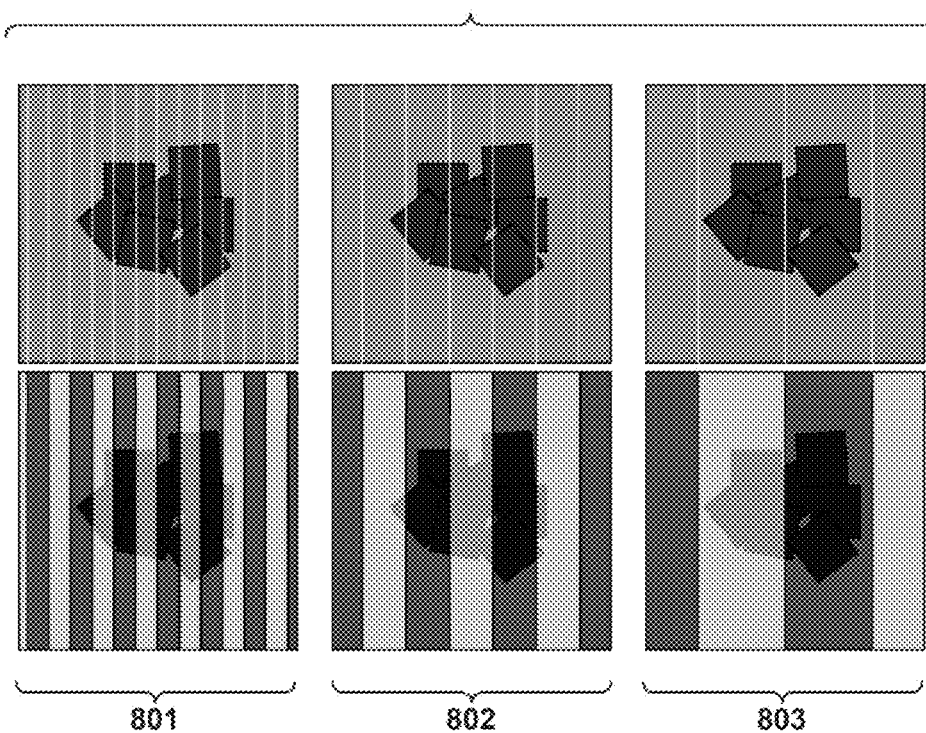
FIG. 8 shows illustrations each showing stripe pattern light used based on the spatial encoding method according to a second embodiment.

A method for setting pattern light characteristics corresponding to irradiation range will now be described. FIG. 8 is an illustration showing images captured by the image capturing unit 102 when irradiating an object to be measured 100 with stripe pattern light beams at the time of the spatial encoding-based three-dimensional measurement of the object to be measured 100. Note that although stripes on an object to be measured in actually captured images are displaced in accordance with its height, the above stripe pattern light beams emitted are depicted as they are for the sake of simplification. The order of the spatial encoding according to the embodiment is from 801 to 803, i.e., irradiation with light with a pattern of thin stripes is performed first, and irradiation with light with a pattern of the thickest stripes is performed last.

Figure 9:
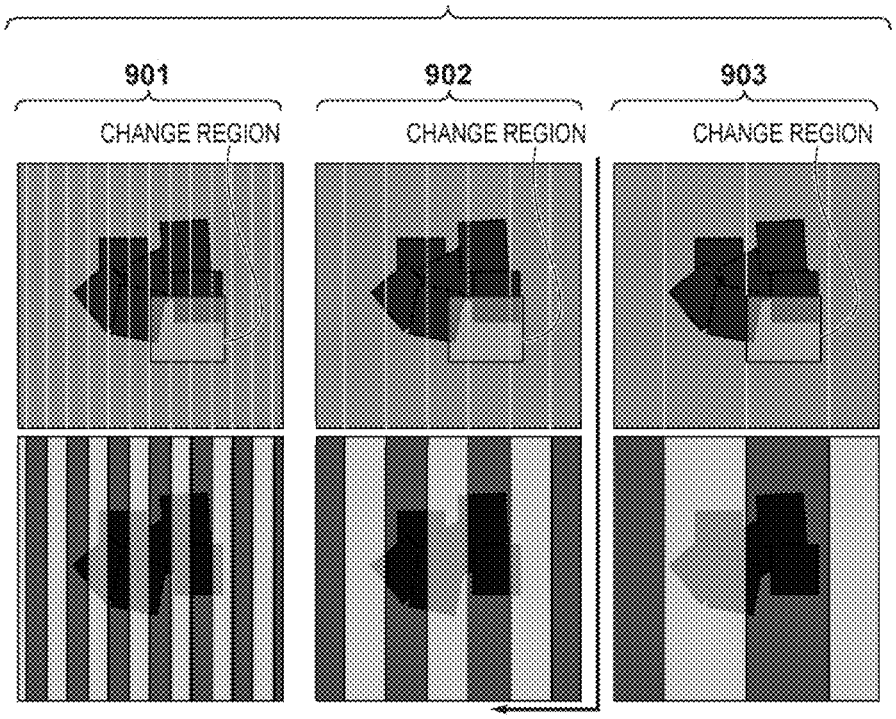
FIG. 9 shows illustrations each showing ranges irradiated with stripe pattern light used based on the spatial encoding method according to the second embodiment.

FIG. 9 is an illustration showing images captured by the image capturing unit 102 when irradiating an object to be measured 100 with stripe pattern light beams at the time of its spatial encoding-based three-dimensional measurement after removal of part of the object to be measured 100. Note that although stripes on an object to be measured in actually captured images are displaced in accordance with its height, the above stripe pattern light beams emitted are depicted as they are for the sake of simplification.

The foregoing removed part, i.e., the removed region, is extracted by the change region extraction unit 107 as a change region, following which a range to be irradiated with stripe pattern light is set by the irradiation range setting unit 108. It is unnecessary to three-dimensionally measure regions other than the set irradiation range because their three-dimensional shapes do not change. That is, it is unnecessary to use regions represented as thick stripes other than the set irradiation range for the three-dimensional measurement (see a case denoted by reference numeral 903). In FIG. 9, three-dimensional measurement using the thinner stripe pattern light can be made until the stripe pattern light becomes even within the irradiation range (see cases denoted by reference numerals 901 902).

Incidentally, although regions above and below the irradiation range set in accordance with the extracted change region are also irradiated with the stripe pattern light in FIG. 9, it is unnecessary to irradiate both regions. By setting pattern light characteristics corresponding to an irradiation range as a change region as described above, the number of stripe pattern light beams to be emitted can be reduced, and the number of images to be captured can, therefore, be reduced; thus a significantly enhanced three-dimensional measurement speed can be achieved when compared with the three-dimensional measurement of the whole area of a single image.

Third Embodiment

A third embodiment of the present invention will be described below with reference to the drawings. The third embodiment differs from the first and second embodiments in that after the setting of pattern light irradiation range by the irradiation range setting unit 108 subsequent to the extraction of a change region by the change region extraction unit 107, another irradiation pattern is used at the irradiation range. Specifically, the above change refers to an actual change from the spatial encoding-based measurement method to a phase-shift-based measurement method.

The configuration of a three-dimensional measurement apparatus according to the third embodiment is the same as the configuration of the apparatus according to the first embodiment of FIG. 1, and its description will, therefore, be omitted. In this embodiment, the order of the processing shown as FIGS. 2 to 4 is used as in the case of the first embodiment, and its description will also be omitted. In the following, the foregoing difference will be further described.

Figure 10:
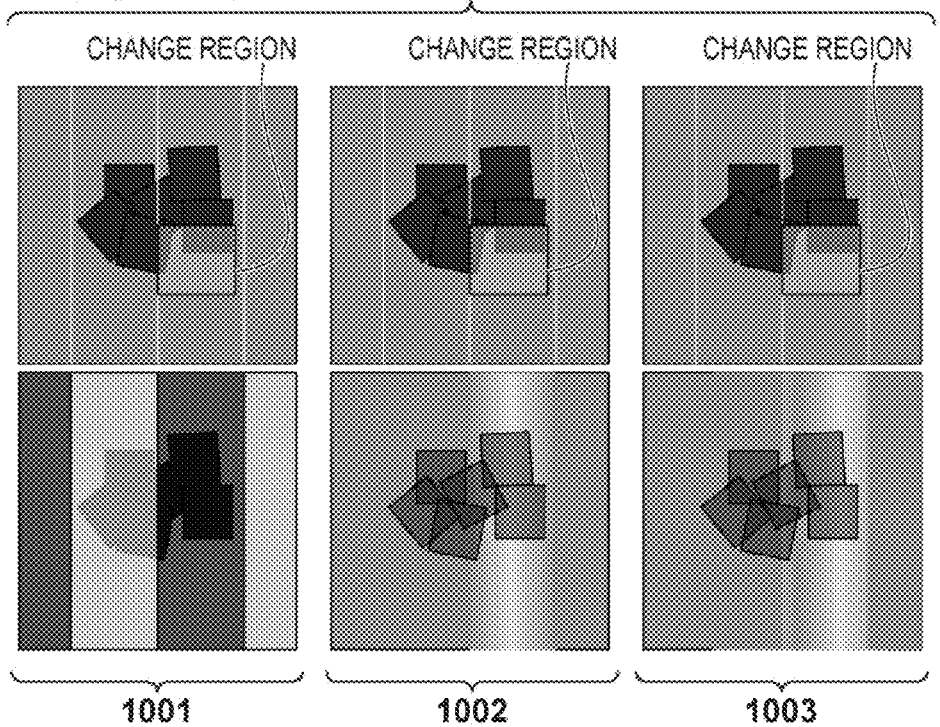
FIG. 10 shows illustrations each showing ranges irradiated with stripe pattern light used based on a phase-shift method according to a third embodiment.

A method for setting pattern light characteristics corresponding to irradiation range will now be described. FIG. 10 is an illustration showing images captured by the image capturing unit 102 when having irradiated an object to be measured 100 with stripe pattern light beams based on a phase-shift method after the setting of pattern light irradiation range by the irradiation range setting unit 108 subsequent to the extraction of a change region by the change region extraction unit 107. Note that although stripes on an object to be measured in actually captured images are displaced in accordance with its height, the above stripe pattern light beams emitted are depicted as they are for the sake of simplification.

Reference numeral 1001 in FIG. 10 denotes a case where when stripe pattern irradiation has been performed using the space encoding method, a change region is extracted by the change region extraction unit 107, and a range to be irradiated with stripe pattern light is set by the irradiation range setting unit 108. After the setting of the irradiation range, the irradiation range is irradiated with stripe pattern light based on the phase-shift method as shown by reference numeral 1002 in FIG. 10. Reference numeral 1003 in FIG. 10 denotes a state in which the stripe pattern light has shifted based on the phase-shift method.

Figure 15:
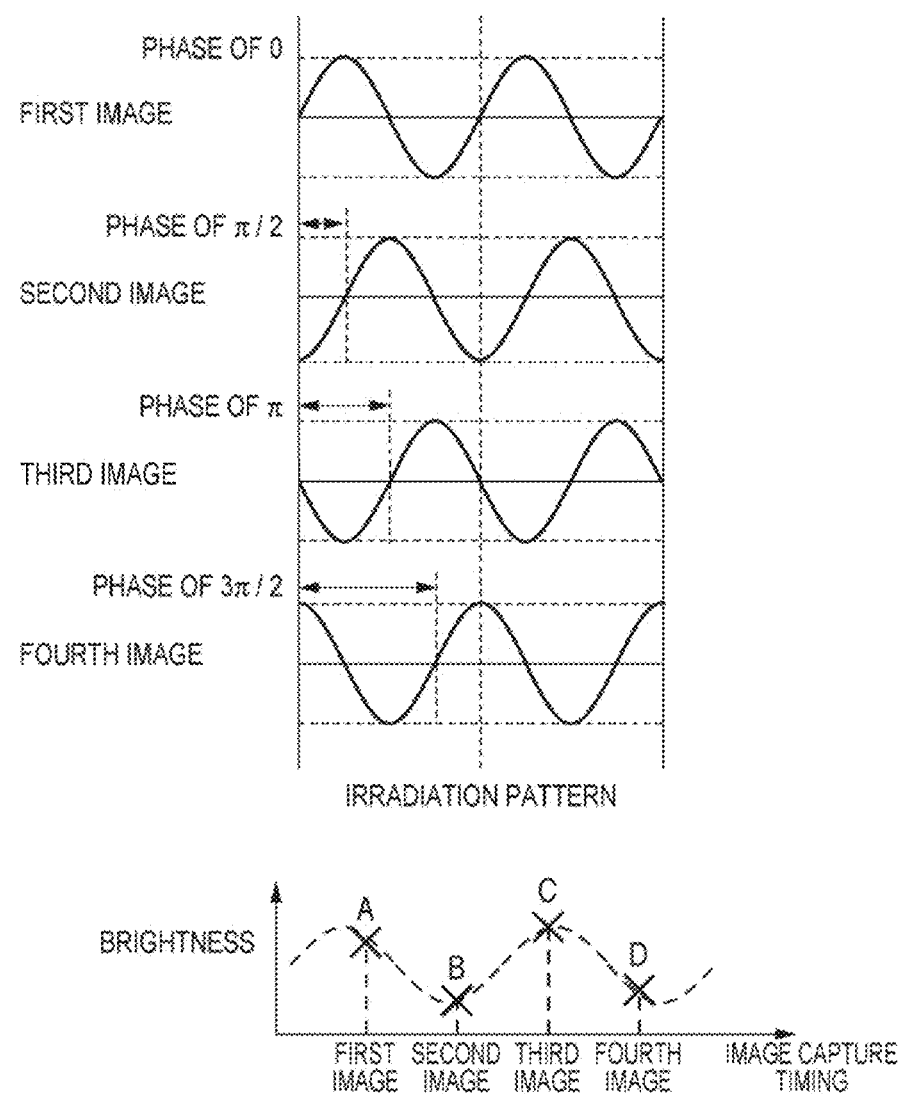
FIG. 15 is an explanatory drawing of the phase-shift method.

Details of the phase-shift method will now be described with reference to FIG. 15. In the phase-shift method, an object to be measured is irradiated with stripe pattern light the brightness of which changes sinusoidally, and the phase of the stripe pattern light is consecutively shifted by $\pi/2$ to capture images of the object to be measured at the image capturing unit 102. The image capture is performed four times until the phase reaches $2\pi$. In a case where it has been assumed that brightness levels at the same position in the four images are A, B, C, and D, the phase $\alpha$ of the patterns at the position is expressed by the following expression (1).

$$\alpha = \tan^{-1}\frac{D-B}{A-C} \tag{1}$$

The three-dimensional measurement can be made upon the principles of the triangulation method based on the phase. In the phase-shift method, when the phase $\alpha$ is within 360° C., three-dimensional data on an object to be measured can be obtained consecutively as compared with the spatial encoding; however, when the phase $\alpha$ exceeds 360° C., there is a need to perform the connection between its three-dimensional positions. Therefore the three-dimensional shape of a change region can be measured without performing phase switching by irradiating an irradiation range with stripe pattern light at a phase of 360° C.

Incidentally, although regions above and below the irradiation range set in accordance with the extracted change region are also irradiated with the stripe pattern light in FIG. 10, it is unnecessary to irradiate both regions. And further, a phase-shift method using different frequencies may be applied to the three-dimensional shape measurement method using the phase connection method intended to be applied to a large field. In the three-dimensional shape measurement method to which such a phase-shift method is applied, a technique may be used in which measurement processing using different frequencies is started at a maximum-frequency phase-shift pattern, and low-frequency measurement is discontinued at a point in time when no change has occurred by using advance data.

Fourth Embodiment

A fourth embodiment of the present invention will be described below with reference to the drawings. The fourth embodiment differs from the foregoing three embodiments in that after the setting of pattern light irradiation range by the irradiation range setting unit 108 subsequent to the extraction of a change region by the change region extraction unit 107, another irradiation pattern is used on the irradiation range. Specifically, an actual change from the spatial encoding method-based measurement technique to an optical cutting method-based measurement technique is made.

Figure 11:
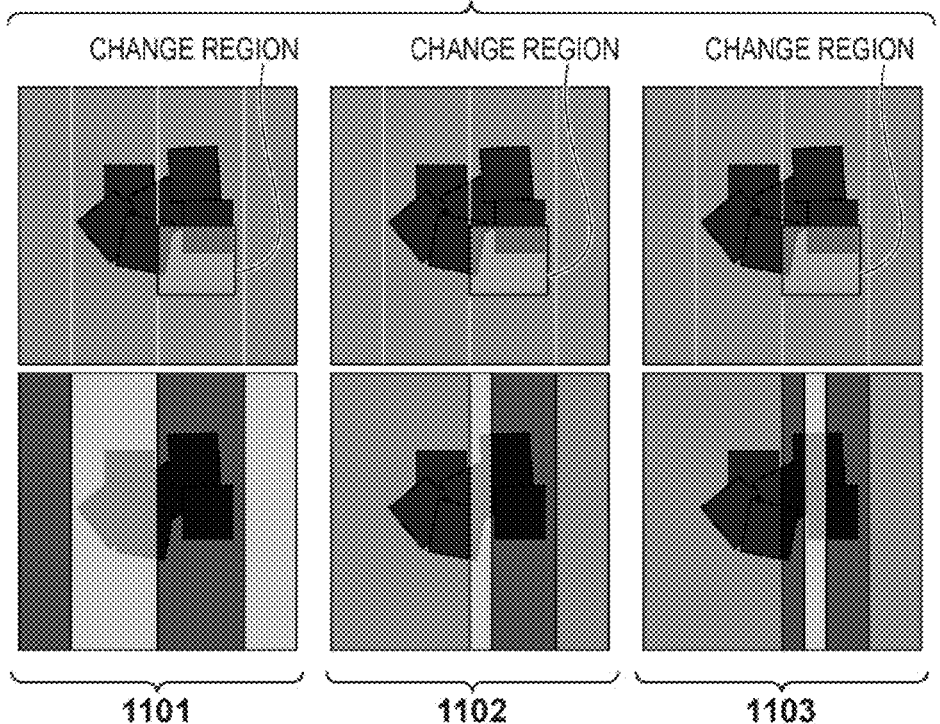
FIG. 11 shows illustrations each showing ranges irradiated with stripe pattern light used based on an optical cutting method according to the third embodiment.

FIG. 11 is an illustration showing each image captured by the image capturing unit 102 when irradiating an object to be measured 100 within an irradiation range with pattern light based on the optical cutting method after the setting of the pattern light irradiation range by the irradiation range setting unit 108 subsequent to the extraction of a change region by the change region extraction unit 107. Note that although stripes on an object to be measured in actually captured images are displaced in accordance with its height, the above stripe pattern light emitted is depicted as it is for the sake of simplification.

With an optical cutting method, it takes time to make three-dimensional measurement in general because images are captured while moving pattern light; however, an enhanced three-dimensional measurement speed can be achieved by determining only a change region to be an irradiation range (see cases represented by reference numerals 1102 and 1103 of 1101, 1102 and 1103 in FIG. 11). And further, in cases where there are a plurality of change regions, by simultaneously measuring the change regions based on a multi-line optical cutting method, an enhanced three-dimensional measurement speed can be achieved as in the case where there is only one change region. Incidentally, although regions above and below an irradiation range set in accordance with an extracted change region are also irradiated with stripe pattern light in FIG. 11, it is unnecessary to irradiate both regions.

By setting pattern light characteristics corresponding to an irradiation range as a change region as described above, the number of stripe pattern light beams to be emitted can be reduced, and the number of images to be captured can, therefore, be reduced; thus a significantly enhanced three-dimensional measurement speed can be achieved when compared with the three-dimensional measurement of the whole area of a single image.

Fifth Embodiment

A fifth embodiment of the present invention will be described below. The fifth embodiment differs from the foregoing four embodiments in that after the extraction of a change region by the change region extraction unit 107, the light characteristic setting unit 109 sets pattern light characteristics, and then depth range to be three-dimensionally measured and measurement time are set.

The depth range to be three-dimensionally measured can be set based on the thickness or the minimum thinness of the stripes of pattern light set by the light characteristic setting unit 109 with respect to the change region extracted by the change region extraction unit 107. In addition to that, the measurement time can be set from the set stripe pattern light. The pattern light characteristics may be automatically set from the extracted change region, or may be manually set by the user.

Sixth Embodiment

A sixth embodiment of the present invention will be described below. The sixth embodiment differs from the foregoing five embodiments in that the irradiation range setting unit 108 sets irradiation range, depth range to be three-dimensionally measured is set, and then the light characteristic setting unit 109 sets pattern light characteristics.

The thickness or the minimum thinness of the stripes pattern light can be set from the irradiation range set by the irradiation range setting unit 108 and the set depth range to be three-dimensionally measured. In addition to that, measurement time can be set from the set stripe pattern light.

The irradiation range setting unit 108 may set irradiation range without reference to a change region extracted by the change region extraction unit 107. Depth range to be three-dimensionally measured may be set by the control unit 111. Irradiation range and depth range may be automatically set, or may be manually set by the user.

Seventh Embodiment

A seventh embodiment of the present invention will be described below. The seventh embodiment differs from the foregoing six embodiments in that the light characteristic setting unit 109 sets pattern light characteristics, and then depth range to be three-dimensionally measured and measurement time are set.

Depth range to be three-dimensionally measured can be set from the thickness or the minimum thickness of the stripes of pattern light set by the light characteristic setting unit 109. In addition to that, the measurement time can be set from the set stripe pattern light.

The light characteristic setting unit 109 may set pattern light characteristics without reference to a change region extracted by the change region extraction unit 107. Pattern light characteristics may be automatically set, or may be manually set by the user.

According to the present invention, high-speed three-dimensional measurement can be made by effectively using three-dimensional data obtained in advance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-293804 filed on Dec. 28, 2010, which is hereby incorporated by reference herein in its entirety.

What is claimed is:

1. An apparatus for measuring a three-dimensional shape of an object comprising:
    an image capturing unit configured to capture an image including the object;
    a change region extraction unit configured to extract a change region where a change has occurred from a previously captured image including the object previously captured by the image capturing unit since a previous measurement of the three-dimensional shape of the object, based on the image captured by the image capturing unit;
    a setting unit configured to set a stripe pattern which includes a bright portion and a dark portion and in which at least one width of the bright portion and the dark portion is smaller than a width of the change region extracted by the change region extraction unit, from a plurality of stripe patterns in which at least one width of the bright portion and the dark portion is different between the patterns;
    a projection unit configured to project the set stripe pattern onto the object; and
    a measurement unit configured to measure the three-dimensional shape of the object at the change region in an image captured by the image capturing unit, where the change region is projected with the set stripe pattern.

2. The apparatus according to claim 1, further comprising an irradiation control unit configured to perform control for setting a range to be projected with the pattern to be projected by the projection unit in accordance with a size of the change region extracted by the change region extraction unit.

3. The apparatus according to claim 1, wherein the characteristics of the pattern set by the setting unit are characteristics exhibited based on at least one of a spatial encoding method, a phase-shift method, and an optical cutting method.

4. The apparatus according to claim 1, wherein the setting unit sets the characteristics of the pattern based on a result of three-dimensional measurement of the change region extracted by the change region extraction unit performed by the measurement unit and on the image of the change region captured by the image capturing unit.

5. The apparatus according to claim 1, wherein the measurement unit measures a subsequent three-dimensional shape of the object based on the result of the three-dimensional measurement of the object and a result of the three-dimensional measurement of the change region of the object.

6. An method for measuring a three-dimensional shape of an object comprising:
    capturing an image including the object with an image capturing unit;
    extracting, with a change region extraction unit, a change region where a change has occurred from a previously captured image including the object, previously captured by the image capturing unit, since a previous measurement of the three-dimensional shape of the object, based on the image captured by the image capturing unit;
    setting, with a setting unit, a stripe pattern which includes a bright portion and a dark portion and in which at least one width of the bright portion and the dark portion is smaller than a width of the change region extracted by the change region extraction unit, from a plurality of stripe patterns in which at least one width of the bright portion and the dark portion is different between the patterns;
    a projection unit configured to project the set stripe pattern onto the object; and
    measuring the three-dimensional shape of the object at the extracted change region of the image captured by the image capturing unit, where the change region is projected with the set stripe pattern.

7. A computer-readable non-transitory storage medium storing a computer program for making a computer execute the steps included in the method according to claim 6.

8. The apparatus according to claim 1, wherein the change region extraction unit extracts the change region by comparing an image of the object captured in advance by the image capturing unit with the image of the object captured by the image capturing unit.

9. The apparatus according to claim 1, wherein
    the projection unit projects onto the object sequentially from a stripe pattern in which a width of at least one of the bright portion and the dark portion is smallest to the set stripe pattern,
    the image capturing unit sequentially captures the object each time the stripe pattern is sequentially projected, and
    the measurement unit measures the three-dimensional shape of the object based on the sequentially captured images and an image captured when the three-dimensional shape is previously measured.

10. The apparatus according to claim 1, wherein the projection unit projects only the set pattern onto the object.

* * * * *